(12) United States Patent
Liaghati et al.

(10) Patent No.: US 11,489,778 B2
(45) Date of Patent: Nov. 1, 2022

(54) SELECTIVE SENSOR DATA TRANSMISSION

(71) Applicant: The Boeing Company, Chicago, IL (US)

(72) Inventors: Amir Leon Liaghati, Huntsville, AL (US); Roderick Howell, Madison, AL (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 16/787,719

(22) Filed: Feb. 11, 2020

(65) Prior Publication Data

US 2021/0250298 A1    Aug. 12, 2021

(51) Int. Cl.
*H04L 47/35* (2022.01)
*H04L 47/2416* (2022.01)
*H04W 28/02* (2009.01)
*H04W 4/38* (2018.01)
*H04L 43/022* (2022.01)

(52) U.S. Cl.
CPC ........ *H04L 47/2416* (2013.01); *H04L 43/022* (2013.01); *H04W 4/38* (2018.02); *H04W 28/0215* (2013.01)

(58) Field of Classification Search
None
See application file for complete search history.

(56) References Cited

U.S. PATENT DOCUMENTS

| | | | |
|---|---|---|---|
| 9,871,608 B1 | 1/2018 | Chang et al. | |
| 10,003,982 B2 | 6/2018 | Chang et al. | |
| 10,693,495 B2 * | 6/2020 | Liaghati | H04L 67/12 |
| 2017/0324537 A1 | 11/2017 | Liaghati et al. | |

* cited by examiner

*Primary Examiner* — Willie J Daniel, Jr.
(74) *Attorney, Agent, or Firm* — Bell & Manning, LLC

(57) ABSTRACT

A system controls a transmission of data. A sensor datum measured by a sensor is received. Whether to send the received sensor datum to a multiplexer is determined based on a predefined real time download rate. When the determination indicates to send the received sensor datum to the multiplexer, the received sensor datum is sent to the multiplexer. When the determination does not indicate to send the received sensor datum to the multiplexer, the received sensor datum is written to a data file. The written sensor datum is sent from the data file to the multiplexer when there is an indicator of excess available bandwidth.

20 Claims, 5 Drawing Sheets

SELECTIVE SENSOR DATA TRANSMISSION

REFERENCE TO GOVERNMENT RIGHTS

The invention described herein was made in the performance of work under NASA Contract No. NNM07AB03C and is subject to the provisions of Section 305 of the National Aeronautics and Space Act of 1958 (72 Stat.435: 42U.S.C.2457).

BACKGROUND

Data may be gathered from sensors mounted on various components of a device to monitor a performance of the device in real time. The data may be transmitted from the monitored device to a second device tasked with monitoring the performance and for further analysis of the data after receipt by the second device. However, an available bandwidth may limit the amount of data transmitted in real time, which may limit the analytic power of the data. For example, though a higher data sampling rate may be desired from one or more of the sensors to simulate a rocket flight, the limited bandwidth may limit the ability to transmit the higher amount of data that results from the higher data sampling rate to the second device.

SUMMARY

In an example embodiment, a computer-readable medium is provided having stored thereon computer-readable instructions that when executed by a processor, cause a controller to control a transmission of data. A sensor datum measured by a sensor is received. Whether to send the received sensor datum to a multiplexer is determined based on a predefined real time download rate. When the determination indicates to send the received sensor datum to the multiplexer, the received sensor datum is sent to the multiplexer. When the determination does not indicate to send the received sensor datum to the multiplexer, the received sensor datum is written to a data file. The written sensor datum is sent from the data file to the multiplexer when there is an indicator of excess available bandwidth In another example embodiment, a system is provided. The system includes, but is not limited to, a processor and a computer-readable medium operably coupled to the processor. The computer-readable medium has instructions stored thereon that, when executed by the processor, cause the system to control a transmission of data.

In yet another example embodiment, a method of controlling a transmission of data is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
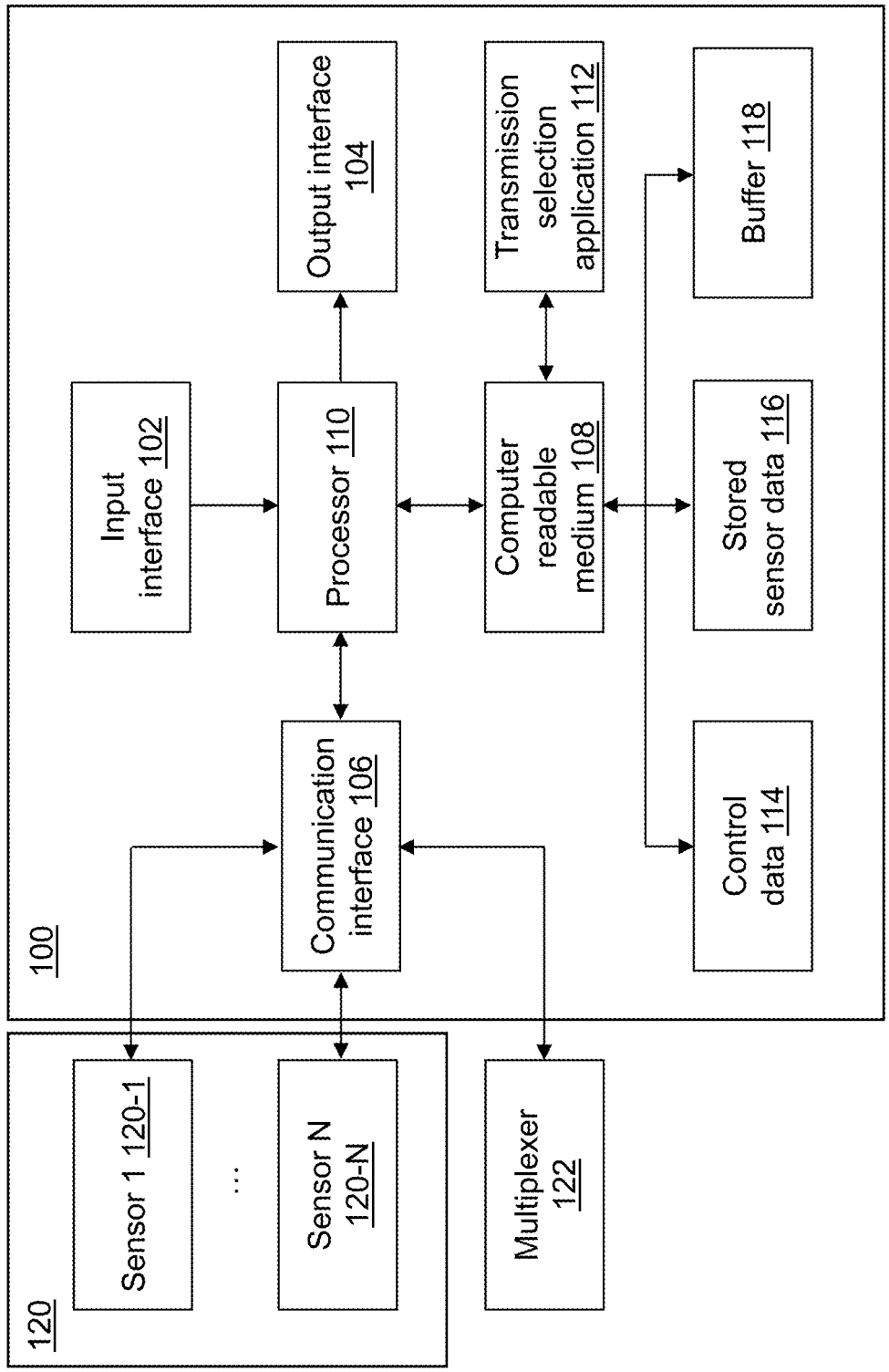
FIG. 1 depicts a block diagram of a controller in accordance with an illustrative embodiment.

Referring to FIG. 1, a block diagram of a controller 100 is shown in accordance with an illustrative embodiment. Controller 100 may include an input interface 102, an output interface 104, a communication interface 106, a non-transitory computer-readable medium 108, a processor 110, a transmission selection application 112, control data 114, stored sensor data 116, and a buffer 118. Fewer, different, and/or additional components may be incorporated into controller 100.

Input interface 102 provides an interface for receiving information from the user or another device for entry into controller 100 as understood by those skilled in the art. Input interface 102 may interface with various input technologies including, but not limited to, a keyboard, a microphone, a mouse, a display, a track ball, a keypad, one or more buttons, etc., to allow the user to enter information into controller 100 or to make selections presented in a user interface displayed on the display. Controller 100 may have one or more input interfaces that use the same or a different input interface technology. The input interface technology further may be accessible by controller 100 through communication interface 106.

Output interface 104 provides an interface for outputting information for review by a user of controller 100 and/or for use by another application or device. For example, output interface 104 may interface with various output technologies including, but not limited to, the display, a second non-transitory computer-readable medium external to controller 100, etc. Controller 100 may have one or more output interfaces that use the same or a different output interface technology. The output interface technology further may be accessible by controller 100 through communication interface 106. The same interface may support both input interface 102 and output interface 104. For example, a touch screen provides a mechanism for user input and for presentation of output to the user.

Communication interface 106 provides an interface for receiving and transmitting data between devices using various protocols, transmission technologies, and media as understood by those skilled in the art. Communication interface 106 may support communication using various transmission media that may be wired and/or wireless. Controller 100 may have one or more communication interfaces that use the same or a different communication interface technology. For example, controller 100 may support communication using an Ethernet port, a Bluetooth antenna, a telephone jack, a USB port, etc. Data and/or messages may be transferred between controller 100 and a plurality of sensors 120 and/or a multiplexer 122 using communication interface 106. In an alternative embodiment, data and/or messages may be transferred between controller 100 and the plurality of sensors 120 and/or multiplexer 122 using input interface 102 and/or output interface 104.

Computer-readable medium 108 is an electronic holding place or storage for information so the information can be accessed by processor 110 as understood by those skilled in the art. Computer-readable medium 108 can include, but is not limited to, any type of random access memory (RAM), any type of read-only memory (ROM), any type of flash memory, etc., such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Controller 100 also may have one or more drives that support the loading of a memory media such as a CD, DVD, an external hard drive, etc. One or more external hard drives further may be connected to controller 100 using communication interface 106.

Processor 110 executes instructions as understood by those skilled in the art. The instructions may be carried out by a special-purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Controller 100 may include a plurality of processors that use the same or a different processing technology.

Transmission selection application 112 performs operations associated with selecting data received from the one or more sensors 120 for submission to multiplexer 122. Some or all of the operations described herein may be embodied in transmission selection application 112. The operations may be implemented using hardware, firmware, software, or any combination of these methods. Referring to the example embodiment of FIG. 1, transmission selection application 112 is implemented in software (comprised of computer-readable and/or computer-executable instructions) stored in computer-readable medium 108 and accessible by processor 110 for execution of the instructions that embody the operations of transmission selection application 112. Transmission selection application 112 may be written using one or more programming languages, assembly languages, scripting languages, etc. Transmission selection application 112 may be integrated with other data processing functions.

Control data 114 may include values associated with parameters that control the selection and transmission of data received from the one or more sensors 120 and sent to multiplexer 122 for further processing for transmission. Stored sensor data 116 may be used to hold data that is not selected for immediate or real time transmission to multiplexer 122. Buffer 118 may be used to temporarily store data while it is being moved from stored sensor data 116 to multiplexer 122.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, an a velocity sensor, an acceleration sensor, etc., that may be mounted to various components used as part of a device or system. Merely for illustration, the device or system is a multi-stage rocket 400 (shown referring to FIG. 4) where a plurality of sensors are mounted to measure various datum values associated with operation of each stage of the multi-stage rocket. The system such as the multi-stage rocket may include a plurality of controllers.

The plurality of sensors 120 may include any number of sensors of any type and combination of types. Each sensor of the plurality of sensors 120 may send a respective sensed datum to controller 100 at a predefined data rate that may vary as a function of time based on the data needs associated with analysis of the sensor data. Each sensor of the plurality of sensors 120 may send the respective sensed datum to controller 100 through one or more intermediate devices.

Multiplexer 122 behaves as a multiple-input, single-output switch that creates an output stream on a single channel based on various rules such as a bandwidth allocation to either individual sensors or groups of sensors associated with a component or function of the device. The system or device may include a plurality of multiplexers to output different channels of data, for example, using different frequencies or encoding and/or to form a larger multiplexer that handles a greater number of input sensor channels. In an illustrative embodiment, multiplexer 122 is implemented electronically. In an alternative embodiment, multiplexer 122 may be integrated with controller 100. Multiplexer 122 may further receive sensed data from other controllers, from other sensors of the plurality of sensors 120 that are not processed by controller 100, and/or from other intermediate devices.

Figure 2:
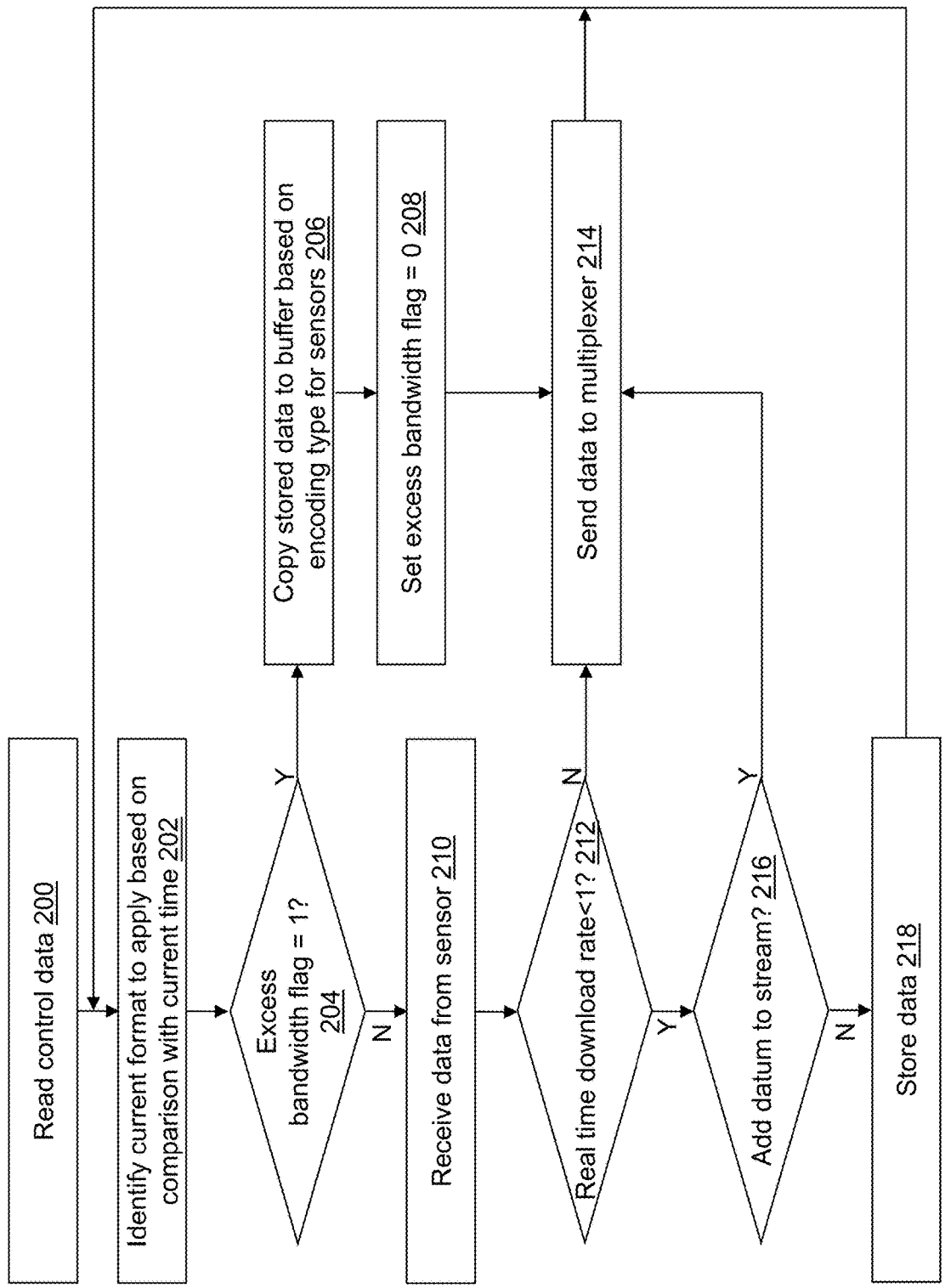
FIG. 2 depicts a flow diagram illustrating examples of operations performed by a transmission selection application of the controller of FIG. 1 in accordance with an illustrative embodiment.

Referring to FIG. 2, example operations associated with transmission selection application 112 are described. Additional, fewer, or different operations may be performed depending on the embodiment of transmission selection application 112. The order of presentation of the operations of FIG. 2 is not intended to be limiting. Some of the operations may not be performed in some embodiments. Although some of the operational flows are presented in sequence, the various operations may be performed in various repetitions, in parallel, and/or in other orders than those that are illustrated.

In an operation 200, control parameters are read from control data 114 or otherwise defined. For example, the control parameters may be defined in transmission selection application 112 instead of being read from control data 114 or may be received through a user interface presented in a display. The control parameters may include a plurality of formats where each format of the plurality of formats defines a bandwidth allocation to apply and a time to apply the bandwidth allocation. Within each format, a total bandwidth allocation may be allocated to individual sensors, to one or more types of sensors, to sensors associated with specific device components, and/or other groups of sensors of the plurality of sensors 120 to define a per sensor group bandwidth allocation that may be applied by multiplexer 122 to create the output stream. A sensor group may include one or more individual sensors, one or more types of sensors, sensors associated with a common device component such as a booster, and/or any other predefined group of sensors of the plurality of sensors 120. Multiplexer 122 may further process overhead associated with the data stream that is included in the output stream.

The control parameters may include a real time download rate, an excess bandwidth flag, an encoding type for sensor datums stored in stored sensor data 116, etc. The control parameters may be defined for each format of the plurality of formats. The control parameters may have one or more values that are different for one or more formats of the plurality of formats. To reduce a number of control parameters to define for each format, some of the parameters may only be defined if they differ from a default value.

The real time download rate may be a value that is greater than zero and less than or equal to one and indicate a rate at which sensor data is incorporated as fast as possible (real time) into the output stream. The real time download rate may be defined separately for each sensor group and/or for each format of the plurality of formats. For example, when the real time download rate is one, all of the sensor data created by a sensor included in the associated sensor group may be downloaded as fast as possible. As another example, when the real time download rate is 0.5, every other sensor datum created by a sensor included in the associated sensor group may be downloaded as fast as possible while remaining sensor datums are written to stored sensor data 116.

The excess bandwidth flag may indicate whether an associated format has bandwidth available in which to incorporate sensor datums from stored sensor data 116 into the output stream. The encoding type may be defined separately for each sensor group and/or for each format of the plurality of formats. For example, an excess bandwidth flag that indicates true, such as by a value of one, indicates that sensor datums from stored sensor data 116 can be incorporated into the output stream; whereas, an excess bandwidth flag that indicates false, such as by a value of zero, indicates that sensor datums from stored sensor data 116 cannot be incorporated into the output stream while a current format is active. When the excess bandwidth flag indicates true, an excess bandwidth value may be defined to indicate how much of the bandwidth may be allocated to incorporate sensor datums from stored sensor data 116 into the output stream. As an option, the value of the excess bandwidth flag may indicate the excess bandwidth value or, alternatively, a distinct value may be included in the control data 114 when the excess bandwidth flag indicates true.

The encoding type may indicate how sensor datums in stored sensor data 116 are incorporated into the output stream. The value of the encoding type may be zero or not defined when the real time download rate is one for a sensor grouping. The encoding type may be defined separately for each sensor group and/or for each format of the plurality of formats. For example, the encoding type may indicate that the sensor datums in stored sensor data 116 are incorporated into the output stream in the order in which they were stored.

As another example, the encoding type may indicate that the sensor datums in stored sensor data 116 are incorporated into the output stream using a secondary download rate. For example, the secondary download rate may be a value that is greater than zero and less than or equal to one and indicate a rate at which a sensor datum created by a sensor included in the associated sensor group is read from stored sensor data 116 and incorporated into the output stream. As an example, when the secondary download rate is one, all of the sensor data created by each sensor included in the associated sensor group may be read from stored sensor data 116 into buffer 118 for transmission as fast as possible by multiplexer 122. As another example, when the secondary download rate is 0.5, every other sensor datum created by a sensor included in the associated sensor group may be read from stored sensor data 116 into buffer 118 for transmission as fast as possible by multiplexer 122, while a remaining sensor datum remains in stored sensor data 116. The sensor datums that remain in stored sensor data 116 may be read from stored sensor data 116 into buffer 118 for transmission as fast as possible by multiplexer 122 once the sensor datums stored in stored sensor data 116 have been processed as discussed further below. As an option, the value of the encoding type may indicate the secondary download rate or, alternatively, a distinct value may be included in the control data 114.

For illustration, a first format is shown below that is active until a first transition time $t_1$ after a start time to that may be zero.

| | Format 1 | | | |
|---|---|---|---|---|
| Sensor Group | Bandwidth allocation megabits/second (Mbps) | Real time download rate | Excess bandwidth flag | Encoding type |
| Core stage | 10 | 0.25 | 0 | 0 |
| Engine | 0.5 | 1.0 | 0 | 0 |
| Payload | 0.5 | 1.0 | 0 | 0 |
| Booster | 6 | 1.0 | 0 | 0 |
| Overhead | 4 | 1.0 | 0 | 0 |
| Total | 21 | | | |

The sensor group "Core stage" refers to sensors that are associated with a core stage of multi-stage rocket 400. The sensor group "Engine" refers to sensors that are associated with the engine of multi-stage rocket 400. The sensor group "Payload" refers to sensors that are associated with a payload of multi-stage rocket 400. The sensor group "Booster" refers to sensors that are associated with a booster stage of multi-stage rocket 400. The sensor group "Overhead" refers to an overhead associated with transmission of the sensor data of multi-stage rocket 400. For illustration, first transition time $t_1$ may be a few seconds before booster separation relative to a launch time of multi-stage rocket 400.

For illustration, a second format is shown below that is active until a second transition time $t_2$ after first transition time $t_1$.

| | Format 2 | | | |
|---|---|---|---|---|
| Sensor Group | Bandwidth allocation Mbps | Real time download rate | Excess bandwidth flag | Encoding type |
| Core stage | 9.5 | 0.25 | 0 | 0 |
| Engine | 0.5 | 1.0 | 0 | 0 |
| Payload | 0.5 | 1.0 | 0 | 0 |
| Booster | 5 | 1.0 | 0 | 0 |
| Overhead | 4 | 1.0 | 0 | 0 |
| Total | 19.5 | | | |

For illustration, second transition time $t_2$ may be just after booster separation relative to the rocket launch time. For illustration, a third format is shown below that is active until a third transition time $t_3$ after second transition time $t_2$.

| Sensor Group | Bandwidth allocation Mbps | Real time download rate | Excess bandwidth flag | Encoding type |
|---|---|---|---|---|
| Format 3 | | | | |
| Core stage | 8.5 | 1.0 | 1 (5.5 Mbps) | 1 (0.333) |
| Engine | 0.5 | 1.0 | 0 | 0 |
| Payload | 1.5 | 1.0 | 0 | 0 |
| Booster | 0.0 | 1.0 | 0 | 0 |
| Overhead | 4.0 | 1.0 | 0 | 0 |
| Total | 14.5 | | | |

Format 3 defines utilization of the excess bandwidth of 5.5 Mbps that becomes available because the booster has separated and sensor data associated with the booster no longer needs to be included in the output stream. Sensor data related to the core stage in excess of what could be downloaded in real time is generated and written to stored sensor data 116. As a result, a higher sampling rate can be generated from one or more of the sensors associated with the "Core stage" sensor group, though the higher sampling rate is not needed in real time. Instead, one of every four sensor datums is to be downloaded in real time while the remaining three are to be stored in stored sensor data 116 to be downloaded after second transition time $t_2$ when excess bandwidth is available. The encoding type with the secondary download rate of 0.333 indicates that one of every three sensor datums stored in stored sensor data 116 is downloaded first. Once those have been processed, one of every two remaining sensor datums stored in stored sensor data 116 is downloaded next. Once those have been processed, the remaining sensor datums stored in stored sensor data 116 are downloaded.

Figure 5:
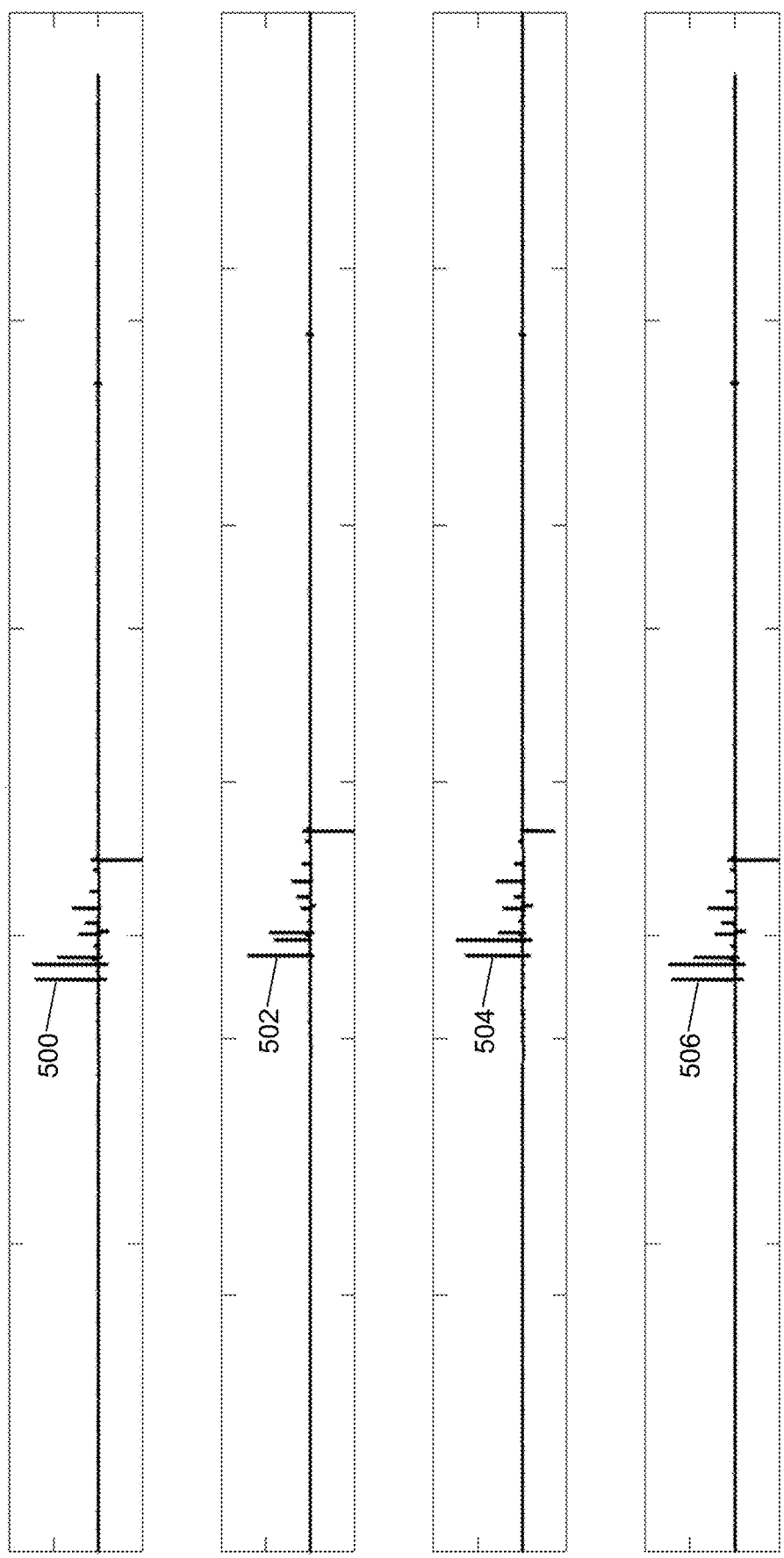
FIG. 5 depicts sampled and reconstructed signals in accordance with an illustrative embodiment.

For illustration, referring to FIG. 5, the encoding type with a real time download rate of 0.5 for a Format 4, and a secondary download rate of 1 for a Format 5 for the same sensor data is shown in accordance with an illustrative sensor. Based on these parameter values, every other sensor datum was stored in stored sensor data 116, while the remaining sensor datums were downloaded. A first datum curve 500 shows the original sensor datums as a function of time. A second datum curve 502 shows the sensor datums as a function of time that were downloaded in real-time. A third datum curve 504 shows the sensor datums as a function of time that were stored until Format 5 was applied. A fourth datum curve 506 shows the sensor datums as a function of time reconstructed from the sensor datums shown in second datum curve 502 and third datum curve 504. A visual comparison of first datum curve 500 relative to second datum curve 502 shows that, due to bandwidth limitations, a lower quality reproduction of the real time sensor datums at the lower sampling rate results while Format 4 is applied. In case of a catastrophic event, application of the lower sampling rate ensures that the first few minutes of the sensor datums is captured in real time. For example, this can be important when the sensor is mounted on multi-stage rocket 400. Nevertheless, the encoding is lossless, meaning the original signal can be reconstructed later as shown by fourth datum curve 506. Sometimes, if a sampling frequency is close to the Nyquist rate, the peaks of an original signal may not be captured. Transmission selection application 112 solves this problem by capturing alternative samples that can be transmitted when bandwidth is available.

The excess bandwidth may be allocated by increasing a sampling frequency of one or more sensors, increasing a resolution of the sensed datum from one or more sensors, increasing a number of sensors from which data is captured, etc., while not changing an initial download rate resulting in sensed datums being written to stored sensor data 116.

When a single sensor group is stored, the excess bandwidth flag and encoding type may be associated with the format instead of each sensor group of the format. As another option, the values for each format need not be defined when they equal default values such as a real time download rate of one, an excess bandwidth flag value of false, and/or an encoding type value of zero. For example, first format may be reduced to that shown below.

| Sensor Group | Bandwidth allocation Mbps | Real time download rate |
|---|---|---|
| Format 1 Reduced | | |
| Core stage | 9.5 | 0.25 |
| Engine | 0.5 | |
| Payload | 0.5 | |
| Booster | 5 | |
| Overhead | 4 | |
| Total | 19.5 | |

In an operation 202, a current format to apply is identified based on a comparison with a current time and the time associated with each format of the plurality of formats that may be a time difference to indicate a time duration of the format or an absolute time relative to the start time $t_0$. For example, when the current time is less than first transition time $t_1$, format 1 is identified; when the current time is greater than or equal to first transition time $t_1$, but less than second transition time $t_2$, format 2 is identified; etc.

In an operation 204, a determination is made concerning whether an excess bandwidth flag is true for the current format or for any sensor group of the current format. If the excess bandwidth flag is true, processing continues in an operation 206. If the excess bandwidth flag is false for the current format or for all of the sensor groups of the current format, processing continues in an operation 210.

In operation 206, sensor data associated with the sensor group having the excess bandwidth flag of true is copied from stored sensor data 116 to buffer 118 based on the encoding type. The excess bandwidth value may be used to define how much of the bandwidth that multiplexer 122 can allocate to the buffered sensor data each second. The encoding type indicates in what order the sensor data read from stored sensor data 116 is written to buffer 118. Again, when the secondary download rate is one, the sensor data read from stored sensor data 116 is written to buffer 118 in the order read in a single pass through stored sensor data 116. When the secondary download rate is less than one, the sensor data read from stored sensor data 116 is processed in a number of passes defined by $p=1/r$, where r is the secondary download rate, and p is the number of passes that is an integer value. On a first pass n=1, a first non-processed sensor datum associated with each sensor of the sensor group is read from stored sensor data 116 and written to buffer 118, and a remaining p−n sensor datum values associated with a respective sensor of the sensor group are skipped. On each successive pass up to the number of passes p, n=n+1, a next non-processed sensor datum associated with each sensor of the sensor group is read from stored sensor data 116 and written to buffer 118, and a remaining p−n sensor datum values associated with the respective sensor of the sensor group are skipped until each non-processed sensor datum is written to buffer 118. As a result, the sensor datums of each sensor of the sensor group are sampled and downloaded based on the secondary download rate. A stored indicator may be included to indicate that the data was previously stored instead of being processed real time (as fast as possible).

Though not shown, the sensed data read from stored sensor data 116 and ordered based on the secondary download rate may be stored separately and written to buffer 118 in chunks based on a size of buffer 118 defined by the excess bandwidth value. Each second or other time allocation, a content of buffer 118 is sent to multiplexer 122 until the ordered sensor data is all buffered into buffer 118 and sent to multiplexer 122. The remaining portion of the bandwidth may be allocated to sensor data that continues to accumulate in real time and is processed in operations 210 to 218 in a continuous loop.

In an operation 208, excess bandwidth flag may be reset to false or zero to indicate that the stored data has already been written to buffer 118 to be incorporated into the output stream by multiplexer 122 based on the excess bandwidth value, and processing continues in operation 214 to send the buffered data to multiplexer 122.

In operation 210, a new sensor datum is received by controller 100 from a sensor, for example, through input interface 102 or communication interface 106. The new sensor datum may include an identifier of the sensor, the sensor type, and/or the sensor group in addition to a time at which the sensor datum was measured or otherwise captured by the sensor.

In an operation 212, a determination is made concerning whether a real time download rate for the sensor is less than one. If the real time download rate for the sensor is less than one, processing continues in an operation 216. If the real time download rate for the sensor is not less than one, processing continues in operation 214 to send the sensor datum to multiplexer 122 for transmission as fast as possible. The identifier of the sensor, the sensor type, the sensor group, and/or the time at which the sensor datum was measured may also be included with the sensor datum so that sensor datums from the same sensor may later be aligned in time.

In operation 214, the sensor datum is sent to multiplexer 122, and processing continues in operation 202 to maintain a selection of the current format and to continue to receive and process sensor data.

In operation 216, a determination is made concerning whether the sensed datum is sent to multiplexer 122 for transmission as fast as possible on the output stream based on the real time download rate. If the sensed datum is sent to multiplexer 122 for transmission as fast as possible, processing continues in operation 214 to send the sensor datum to multiplexer 122 for transmission as fast as possible. The identifier of the sensor, the sensor type, the sensor group, and/or the time at which the sensor datum was measured may also be included with the sensor datum so that sensor datums from the same sensor may later be aligned in time. If the sensed datum is not sent to multiplexer 122 for transmission as fast as possible, processing continues in an operation 218. For example, a counter of sensed datums may be maintained for each sensor to determine which sensed datum samples are sent to multiplexer 122 and which are stored in stored sensor data 116 for later transmission depending on the real time download rate.

In operation 218, the sensed datum is stored in stored sensor data 116, and processing continues in operation 202 to maintain a selection of the current format and to continue to receive and process sensor data as well as buffer data. The identifier of the sensor, the sensor type, the sensor group, and/or the time at which the sensor datum was measured may also be included with the stored sensor datum so that sensor datums from the same sensor may be aligned in time.

For illustration, a sensed data sample from a first sensor of the plurality of sensors 120 may include [0, 2.9389, 4.7553, 4.7553, 2.9389, 0.0000, −2.9389, −4.7553, −4.7553, −2.9389, . . . ]. When the real time download rate is 0.333, the following sensed data sample is sent to multiplexer 122 in operations 216 and 214 to affect a real time transmission, [0, 4.7553, −2.9389, −2.9389, . . . ]. When the secondary download rate is 1.0, the following sensed data sample is buffered to multiplexer 122 in operations 206 and 214, [2.9389, 4.7553, 2.9389, 0.0000, −4.7553, −4.7553, . . . ]. In contrast, when the secondary download rate is 0.5, the following sensed data sample is buffered to multiplexer 122 in operations 206 and 214, [2.9389, 2.9389, −4.7553, . . . , 4.7553, 0.0000, −4.7553, . . . ]. Again, the ordered data may be stored temporarily as it is written to buffer 118 based on the excess bandwidth value.

Figure 3:
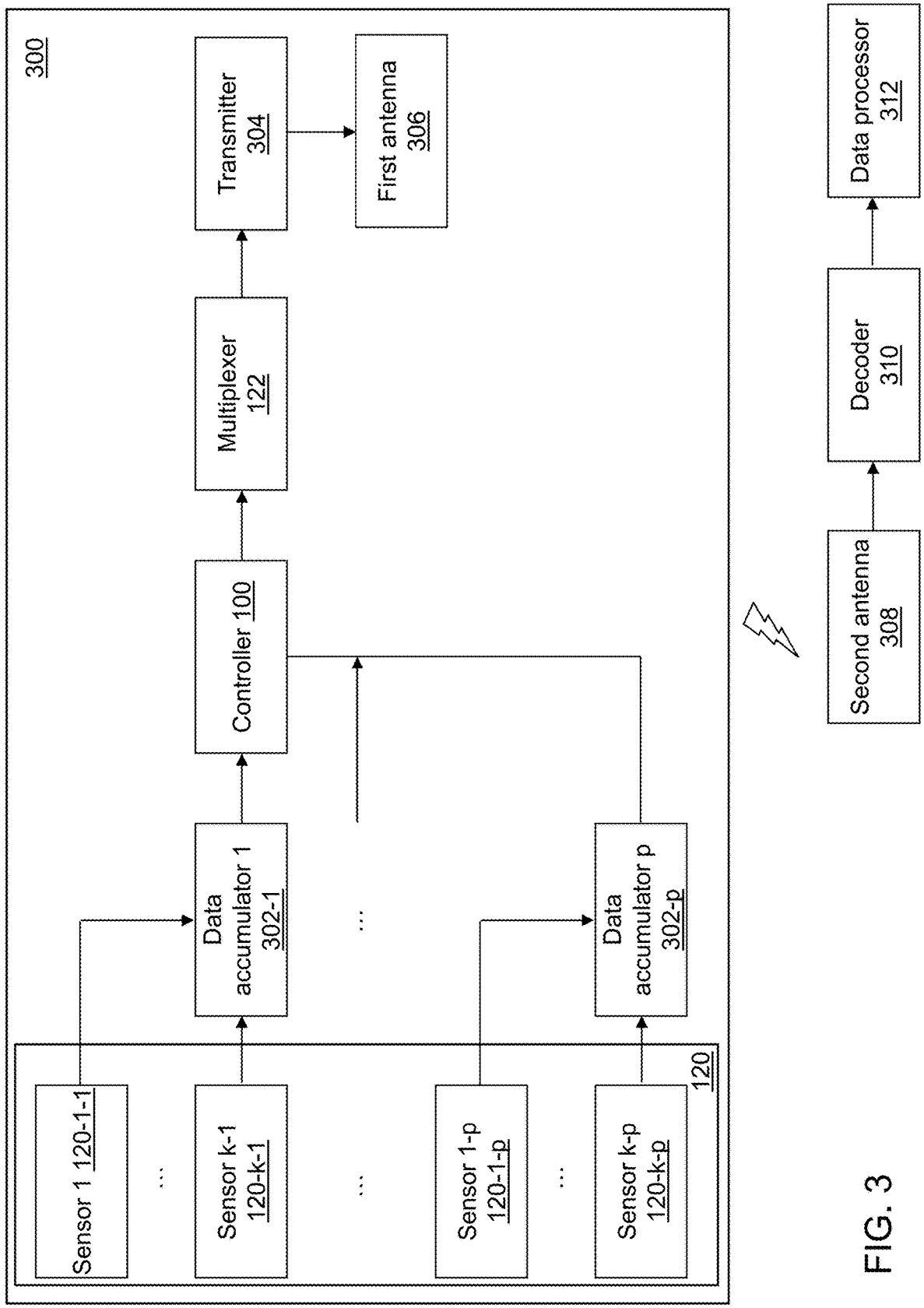
FIG. 3 depicts a block diagram of a transmission system in accordance with an illustrative embodiment.

Referring to FIG. 3, a block diagram of a transmission system 300 is shown in accordance with an illustrative embodiment. In the illustrative embodiment, transmission system 300 may include the plurality of sensors 120 where subsets of the plurality of sensors 120 send their sensed datums to different data accumulators that are intermediate devices between the plurality of sensors 120 and controller 100. For example, a first sensor subset includes sensors 120-1-1 to 120-$k$-1, . . . , and a $p^{th}$ sensor subset includes sensors 120-1-$p$ to 120-$k$-$p$, where k may be different for each subset. The first sensor subset communicates its sensed datums to a first data accumulator 302-1, . . . , and the $p^{th}$ sensor subset communicates its sensed datums to a $p^{th}$ data accumulator 302-$p$. First data accumulator 302-1, . . . , and $p^{th}$ data accumulator 302-$p$ communicate their sensed datums to controller 100. Controller 100 executes transmission selection application 112 to determine that sensed datums sent to multiplexer 122.

Multiplexer 122 sends the output stream to a transmitter 304. Transmitter 304 generates a signal stream that includes the output stream and sends it to a first antenna 306 associated with the device such as an antenna mounted on multi-stage rocket 400. First antenna 306 radiates the signal in an electromagnetic wave at a center frequency to a second antenna 308 that receives the electromagnetic wave and converts it to a received signal. Transmission system 300 may include a plurality of controllers, a plurality of multiplexers, and/or a plurality of antennas.

For example, second antenna 308 may be a ground or satellite-based antenna. The received signal is processed by a decoder 310, for example, to associate sensor data with an originating sensor using the sensor identifier and to time align the sensed data using the time included with the sensed datum.

The decoded signal may be sent to a data processor 312 to process the sensed data. The stored indicator may identify data that was not sent in real time. Data processor 312 may use the sensed data to study a behavior of the system on which the plurality of sensors 120 are mounted. When stored sensor data 116 is received at the secondary download rate, a quality of the behavior analysis can be increased as the higher sampling rate for one or more sensors is received. Use of stored sensor data 116 supports the higher quality analysis without negatively impacting bandwidth requirements or requiring a higher bandwidth allocation that may be limited during earlier processing.

Figure 4:
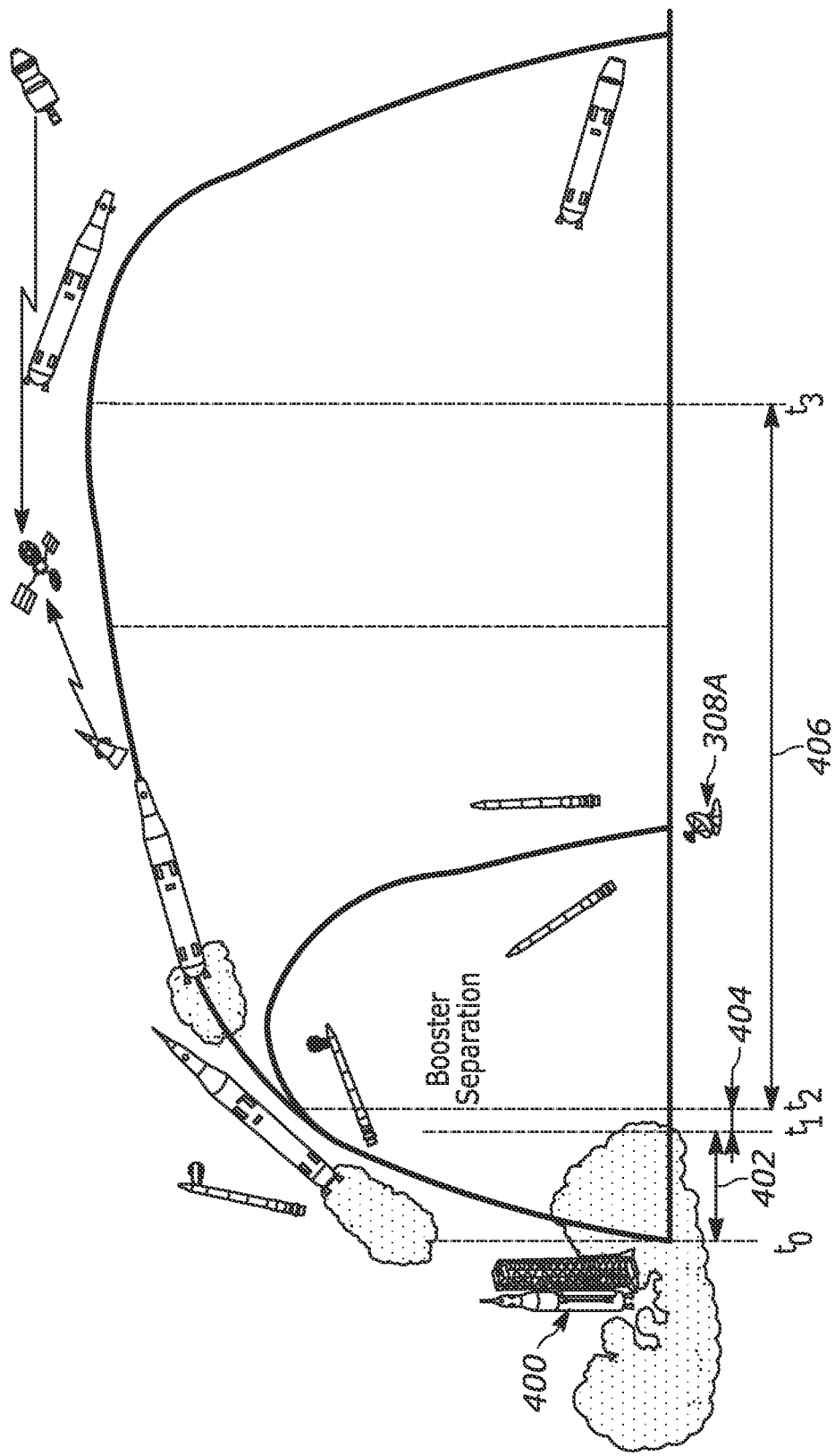
FIG. 4 depicts a flight transmission timeline in accordance with an illustrative embodiment.

Referring to FIG. 4, a flight transmission timeline is shown for multi-stage rocket 400 in accordance with an illustrative embodiment. The plurality of sensors 120 are mounted to various components of multi-stage rocket 400 as discussed above for format 1, format 2, and format 3. A dish antenna 308a receives the electromagnetic wave transmissions from first antenna 306 mounted on multi-stage rocket 400. Format 1 is used to control the content of the output stream during a first time window 402. Format 2 is used to control the content of the output stream during a second time window 404. Format 3 is used to control the content of the output stream during a third time window 406.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   receive a sensor datum measured by a sensor;
   determine whether to send the received sensor datum to a multiplexer based on a predefined real time download rate;
   when the determination indicates to send the received sensor datum to the multiplexer, send the received sensor datum to the multiplexer;
   when the determination does not indicate to send the received sensor datum to the multiplexer, write the received sensor datum to a data file;
   identify a current format to apply based on a current time;
   determine if the identified current format includes an indicator of excess available bandwidth; and
   when the identified current format includes the indicator of excess available bandwidth,
      read the written sensor datum from the data file;
      store the read sensor datum in a buffer; and
      send the stored sensor datum from the buffer to the multiplexer.

2. The non-transitory computer-readable medium of claim 1, wherein the multiplexer is coupled to a first antenna configured to transmit the received sensor datum to a second antenna.

3. The non-transitory computer-readable medium of claim 1, wherein the predefined real time download rate is predefined for the sensor.

4. The non-transitory computer-readable medium of claim 3, wherein the predefined real time download rate is based on a sensor identifier of the sensor.

5. The non-transitory computer-readable medium of claim 3, wherein the predefined real time download rate is based on a sensor type of the sensor.

6. The non-transitory computer-readable medium of claim 3, wherein the predefined real time download rate is based on a component to which the sensor is mounted.

7. The non-transitory computer-readable medium of claim 1, wherein the stored sensor datum is sent to the multiplexer in an order it is written to the data file.

8. The non-transitory computer-readable medium of claim 1, wherein the stored sensor datum is sent to the multiplexer in an order determined based on a secondary download rate predefined for the sensor.

9. The non-transitory computer-readable medium of claim 1, wherein a size of the buffer is selected based on an amount of the excess available bandwidth.

10. A system comprising:
    a processor; and
    a computer-readable medium operably coupled to the processor, the computer-readable medium having computer-readable instructions stored thereon that, when executed by the processor, cause the system to
       receive a sensor datum measured by a sensor;
       determine whether to send the received sensor datum to a multiplexer based on a predefined real time download rate;
       when the determination indicates to send the received sensor datum to the multiplexer, send the received sensor datum to the multiplexer;
       when the determination does not indicate to send the received sensor datum to the multiplexer, write the received sensor datum to a data file;
       identify a current format to apply based on a current time;
       determine if the identified current format includes an indicator of excess available bandwidth; and
       when the identified current format includes the indicator of excess available bandwidth,
          read the written sensor datum from the data file;
          store the read sensor datum in a buffer; and
          send the stored sensor datum from the buffer to the multiplexer.

11. A method of controlling a transmission of data, the method comprising:
    receiving, by a computing device, a sensor datum measured by a sensor;
    determining, by the computing device, whether to send the received sensor datum to a multiplexer based on a predefined real time download rate;
    when the determination indicates to send the received sensor datum to the multiplexer, sending, by the computing device, the received sensor datum to the multiplexer;
    when the determination does not indicate to send the received sensor datum to the multiplexer, writing, by the computing device, the received sensor datum to a data file;
    identifying, by the computing device, a current format to apply based on a current time;

determining, by the computing device, if the identified current format includes an indicator of excess available bandwidth; and when the identified current format includes the indicator of excess available bandwidth,
- reading, by the computing device, the written sensor datum from the data file;
- storing, by the computing device, the read sensor datum in a buffer; and
- sending, by the computing device, the stored sensor datum from the buffer to the multiplexer.

12. The system of claim 10, wherein a size of the buffer is selected based on an amount of the excess available bandwidth.

13. The method of claim 11, wherein the multiplexer is coupled to a first antenna configured to transmit the received sensor datum to a second antenna.

14. The method of claim 11, wherein the predefined real time download rate is predefined for the sensor.

15. The method of claim 11, wherein a size of the buffer is selected based on an amount of the excess available bandwidth.

16. The method of claim 11, wherein the stored sensor datum is sent to the multiplexer in an order it is written to the data file.

17. The method of claim 11, wherein the stored sensor datum is sent to the multiplexer in an order determined based on a secondary download rate predefined for the sensor.

18. The method of claim 11, wherein the predefined real time download rate is based on a sensor identifier of the sensor.

19. The method of claim 11, wherein the predefined real time download rate is based on a sensor type of the sensor.

20. The method of claim 11, wherein the predefined real time download rate is based on a component to which the sensor is mounted.

* * * * *